United States Patent [19]
Hanulik

[11] Patent Number: 6,009,817
[45] Date of Patent: Jan. 4, 2000

[54] PROCESS FOR THE RECYCLING OF BATTERIES, ESPECIALLY DRY BATTERIES

[75] Inventor: Jozef Hanulik, Zurich, Switzerland

[73] Assignee: CT Umweltttechnik AG, Winterthur, Switzerland

[21] Appl. No.: 08/732,261

[22] PCT Filed: Jun. 16, 1995

[86] PCT No.: PCT/CH95/00136

§ 371 Date: Oct. 29, 1996

§ 102(e) Date: Oct. 29, 1996

[87] PCT Pub. No.: WO95/35583

PCT Pub. Date: Dec. 28, 1995

[30] Foreign Application Priority Data

| Jun. 20, 1994 | [CH] | Switzerland | 1942/94 |
| Sep. 14, 1994 | [CH] | Switzerland | 2790/94 |
| Oct. 31, 1994 | [CH] | Switzerland | 3244/94 |
| Oct. 31, 1994 | [CH] | Switzerland | 3245/94 |

[51] Int. Cl.[7] .................................................. F23B 7/00
[52] U.S. Cl. ........................................ 110/342; 110/219
[58] Field of Search ................................... 110/219, 266, 110/342, 346, 347

[56] References Cited

U.S. PATENT DOCUMENTS

| 4,571,261 | 2/1986 | Buren . |
| 5,199,975 | 4/1993 | Gunjishima et al. ................. 75/669 |

FOREIGN PATENT DOCUMENTS

| 0 075 978 | 4/1983 | European Pat. Off. . |
| 0 117 865 | 9/1984 | European Pat. Off. . |
| 0 191 752 | 8/1986 | European Pat. Off. . |
| 0 196 800 | 10/1986 | European Pat. Off. . |
| 0 244 901 | 11/1987 | European Pat. Off. . |
| 0 247 023 | 11/1987 | European Pat. Off. . |
| 0 284 135 | 9/1988 | European Pat. Off. . |
| WO 88/04476 | 6/1988 | WIPO . |
| WO 93/20593 | 10/1993 | WIPO . |

OTHER PUBLICATIONS

Patent Abstracts of Japan, vol. 11, No. 204, JP62029072 (Nomura Kosan KK), Feb. 7, 1987. Abstract.

Bartolozzi, M., "The recovery of metals from spent alkaline-manganese batteries: a review of patent literature", *Resources, Conservation and Recycling*, 4(3):233–240, 1990.

*Primary Examiner*—Henry Bennett
*Assistant Examiner*—Malik N. Drake
*Attorney, Agent, or Firm*—Townsend and Townsend and Crew LLP

[57] ABSTRACT

A process of recycling unsorted batteries. The unsorted batteries are led from a feeding bunker through a shredder directly into a rotary furnace as they arrive from the disposal collection. The shredded batteries are oxidatively burned at a temperature from 400° C. to 900° C. The resulting combustion gases are led via a gas cleansing installation consisting of a dust filter, wet washing filter and active charcoal filter. The oxidized product of combustion resulting from the combustion is fed to a metal winning process. The product of combustion may be burned once again in a further or later step by the rotary furnace after mixing with a reducing substance, coal, after which the resulting reductive product of combustion may again be fed to the metal winning process.

13 Claims, 3 Drawing Sheets

PROCESS FOR THE RECYCLING OF BATTERIES, ESPECIALLY DRY BATTERIES

BACKGROUND OF THE INVENTION

1. Field of the Invention

The present invention relates to a process for the recycling of dry batteries or batteries containing cadmium, zinc, lead or alkali metals using pyrolitic methods, wherein the batteries may be unsorted and be present in shredded or unshredded form. The invention also relates to installations for performing the recycling process.

2. Description of the Prior Art

A large number of processes for recycling batteries are known in which however the batteries must be sorted according to their composition and in which the individual process is suitable for one type of battery only. This is especially true for the known process of the S. N. A. M. company in Lyon, which is suitable only for the processing of Ni—Cd accumulators. Further examples of processes for the recycling of sorted batteries, e.g. used alkali-manganese and zinc-carbon batteries, have e.g. become known from the Japanese patents JP-A-74/106,519 and JP-A-75/60,414. Therein it is proposed to scrap the corresponding batteries, to treat them with hydrochloric acid, and to separate out manganese from the solution as hydroxide by neutralizing with $NH_4OH$ at pH 5, and as $Mn_2O_3$ at pH 9 after addition of $MnO_2$ or $H_2O_2$. In accordance with U.S. Pat. No. 3,438,878 zinc and manganese dioxide are to be won simultaneously in the electrolysis of a solution containing sulphuric acid. All these processes, which use sorted batteries as raw material, are unable to succeed simply because the number of batteries returned is relatively small and always requires subsequent sorting. This means that the intake area for a given installation is so large that the costs of collection are much too high. Various processes have become known which improve the sorting process, which processes follow a separation according to chemical or geometric criteria. The rejected quantity, however, still remains as a critical waste product.

An intermediate step is represented by certain processes which are restricted to reducing the toxicity of waste containing mercury, in which the batteries are taken in unsorted. One example is the process of the Vost company in which the mechanically crushed batteries have their mercury content removed in a vacuum at temperatures of about 400° C. A similar principle was put into operation in the Clean Japan Center by Mitsui Metals Co. and Nomura Kosan Co. This method, which is known as the CJC process, works in such a manner that the batteries are first freed from their metal cases and then thermally treated in two stages at temperatures of 600° C. –800° C.

The most recent processes are those in which unsorted batteries are recycled. One solution is described e.g. by EP-A-150,821 of the Metallgesellschaft AG. Here, the small batteries are first mechanically crushed and certain additives added, whereupon this product is subjected to a chloridizing roasting at a temperature from 580° C. to 700° C. The vaporized mercury is washed out of the exhaust gas. The product of roasting is then treated with dilute hydrochloric acid and the nobler metals then precipitated out of the solution by cementation with zinc. Sumitomo Heavy Industries Ltd. has developed a pyrometallurgical method for processing unsorted batteries. This process provides that the battery scrap be put into a cupola furnace and then run through three successive stages, namely an oxidation stage for distilling off the mercury, a subsequent reduction stage for vaporizing the zinc, and finally a high temperature melting zone in which the entire remaining residue is processed to a fused product. Due to the direct succession of thermal treatment zones in the cupola furnace, certain problems relating to the development of dioxins and PCBs have been observed. Due to the unpredictability of the composition of the furnace charge, the temperature control is extremely difficult to manage. A corresponding test installation in Switzerland burned through. The problems were later eliminated.

Further, there is a process (CH-A 04 969/86-0) which in the mean time has yielded positive results even in continuous operation. In this process, the unsorted batteries are first subjected to a pyrolysis stage in which the organic constituents are burned and the water and mercury are vaporized off. The product of pyrolysis is then shredded and washed, whereupon after addition of $HBF_4$ a solution results which can be separated by means of electrolysis into various relatively very pure metal fractions. In an improved version (WO 93/20593) a second pyrolysis is now performed after the first pyrolysis and the subsequent shredding.

All known processes in which unsorted batteries are recycled have the goal of separating the resulting mixture as far as possible into different fractions which are as pure as possible. None of the known processes with the exception of the last named process of the Recyctec SA company have ever reached the commercial phase. These processes can exist commercially only when the take-back price of the unsorted batteries is high. This prerequisite is compelling since the costs of the installation are enormous.

SUMMARY OF THE INVENTION

The object of the invention is thus to create a process for recycling unsorted batteries containing cadmium, zinc, lead or alkali metals, especially dry batteries, which require substantially lower investment costs for the installation, in order that the recycling costs may be substantially reduced.

The invention is based on the consideration that the costs can be decreased if the number of products provided for reutilization is kept low. A separation of the output products into components was thus out of the question.

The expert immediately recognizes from the process in accordance with the invention that this process can be realized with a few commercially available installation parts. The process essentially comprises simply a feeding bunker, a shredder, and a rotary furnace, as well as a conventional gas cleaner with cyclone or dust filter, wet wash filter and active charcoal filter. This process, which is substantially simplified from the point of view of the technical installation, is based on the recognitions gained from the analysis of the oxidized product of combustion. It turned out namely that this product of combustion is an exceptionally suitable raw material for the zinc/cadmium/lead reclamation in zinc works.

Depending on the situation with respect to purchase conditions and the current raw material prices, the resultant product can be subjected without further modification of the installation to a second combustion following the oxidative combustion using the same means, wherein the combustion proceeds reductively.

In a first step of the process, the elements which are especially critical toxically, are separated off and the remaining material is separated in a second step into two, or a maximum of three, different material mixtures representing input products for known industrial metallurgical processes.

DETAILED DESCRIPTION OF THE PREFERRED EXEMPLARY EMBODIMENTS

Figure 1:
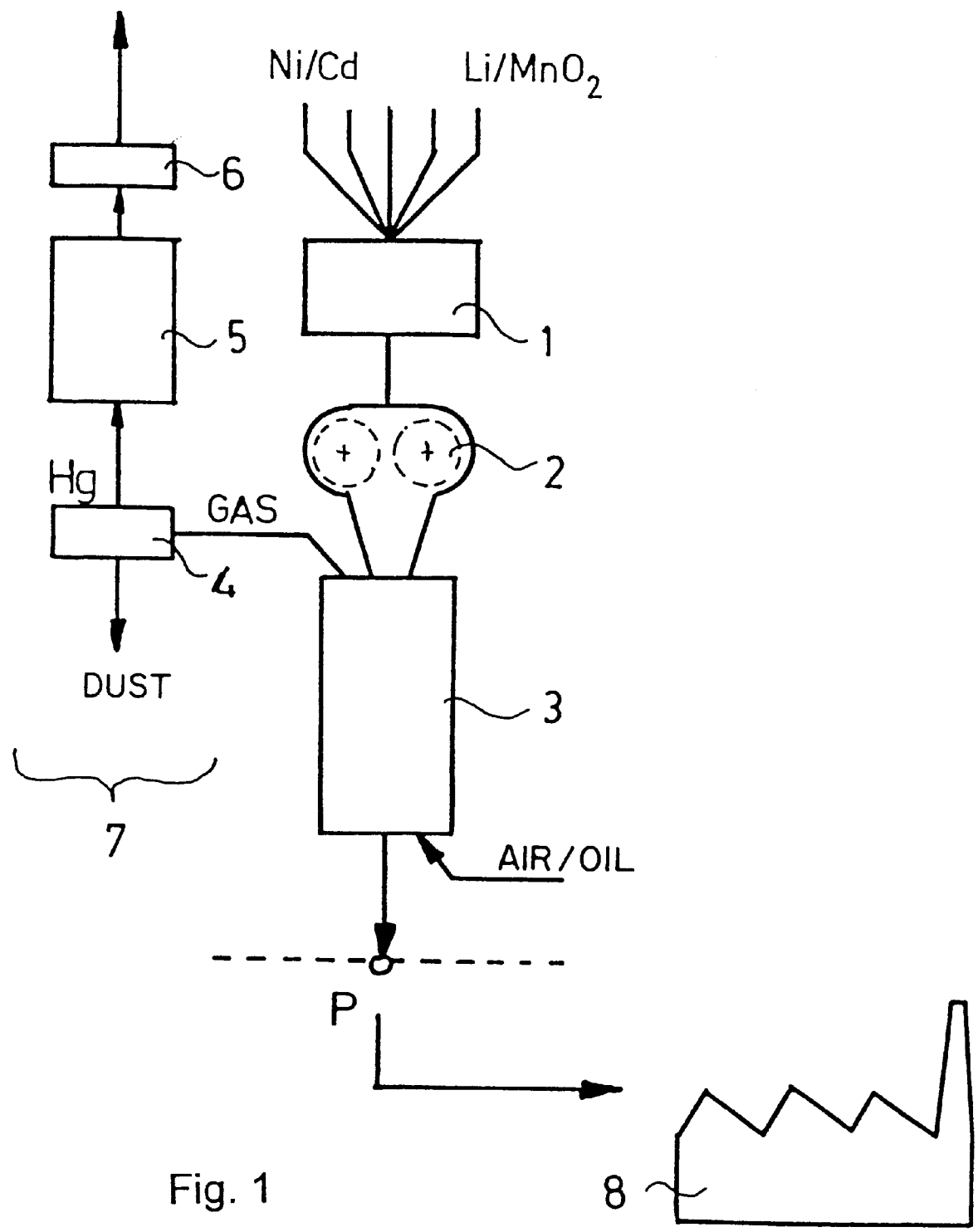
FIG. 1 is a schematic representation of the process in the simplest, yet most complete, variant.

The batteries as collected via the retail trade are of completely differing composition. Relatively strongly represented, for example, are alkali batteries, nickel/cadmium batteries, or lithium/manganese oxide batteries, to name but a few. All these batteries arrive directly at a feeding bunker 1 totally unsorted and uncleansed, some in collection packages of cardboard or plastic. It is sensible, but not compulsory, to work with a feeding bunker, since it is advantageous to operate the process continuously over a longer period of time. There is also a question of economy. From the feeding bunker 1 the unsorted batteries arrive at a shredder 2 via a feed line. The output of this shredder stands in direct connection with the subsequent furnace 3, so that the shredder 2 is suitable for the direct charging of the furnace. The shredder is a part of the installation which can be obtained directly on the market and used without modification. Merely the unconventional connection between the shredder and the furnace 3 requires special manufacture specific to the installation.

During the combustion taking place in the furnace 3, it is important that the material supplied during the combustion process be continuously mixed since this enhances the combustion and improves the degassing. In addition, air must be continuously supplied. Such a combustion is advantageously performed with a rotary furnace. This point will be returned to hereinbelow in reference to FIG. 2. The combustion gases are let out of the furnace and led to a gas cleaner 7. This gas cleaner 7 is also an absolutely conventional industry standard. The gas cleaner 7 here consists of a first cyclone or dust filter 4, by means of which dust present in the corresponding exhaust gases is separated off, whereupon the remaining gases arrive at a wet washing filter 5. In the wet washing filter 5, the mercury vapors, in particular, are condensed out. Some remaining ppm of mercury may succeed in passing through this filter and are thus, again in a known manner, removed from the exhaust gases by means of an active charcoal filter 6. The remaining gases correspond to the air cleanliness specifications and can be released directly into the atmosphere.

From the rotary furnace 3, an oxidized product of combustion P is obtained. This can be led directly or indirectly to the metal winning process 8. In the example represented here the conveyance of the oxidized product of combustion P proceeds directly to the metal winning process 8. Investigations have shown that the product of combustion P is exceptionally suitable as a raw material for metal winning. The product is free of mercury (residual amount less than 1 ppm), no longer contains organic components; and consequently no dioxin or PCB residues result from the subsequent processing in the metal winning process. The composition of the product P results from the following list when the empirically determined percentages are taken into consideration.

| Constituents | Percentage |
| --- | --- |
| ZnO | 10–20 |
| CdO | 2–4 |
| $Fe_2O_3$ | 25–30 |
| $PbO_2$ | 2–4 |
| $MnO_2$ | 20–40 |
| graphite | 5–10 |
| trace elements and salts | remainder |

This product P, produced under laboratory conditions, was sent to various tin works and tested there for suitability as a raw product for the zinc, cadmium and lead winning process. The investigation showed that this raw material is suitable and contains substantially higher concentrations of the metals to be won than the usual raw materials.

Especial emphasis was placed on the avoidance of dioxin and PCB components. It is thus important that the following operating conditions be adhered to:

1. The charging of the furnace with freshly shredded batteries is continuous and in counterflow to the air intake.
2. The operating temperature in the rotary furnace is preferably 600° C. to 700° C. Under certain conditions temperature deviations downwardly to as low as 400° C. and upwardly to as high as 800° C. can be tolerated. The operating temperature can also increase in the direction of passage, is preferably held at first between 400° C. and 700° C. (first phase) and increased in further passage to and held at up to 900° C. (second phase). Whereas in the first phase of combustion a decomposition avoiding dioxins and PCBs is achieved, the residual mercury is completely vaporized off in the second phase.
3. The duration of the combustion, i.e. the time spent by the battery particles in the rotary furnace, must amount to no less than half an hour to an hour and not more than ten hours. Advantageously it should amount to between 45 and 90 minutes.

Figure 2:
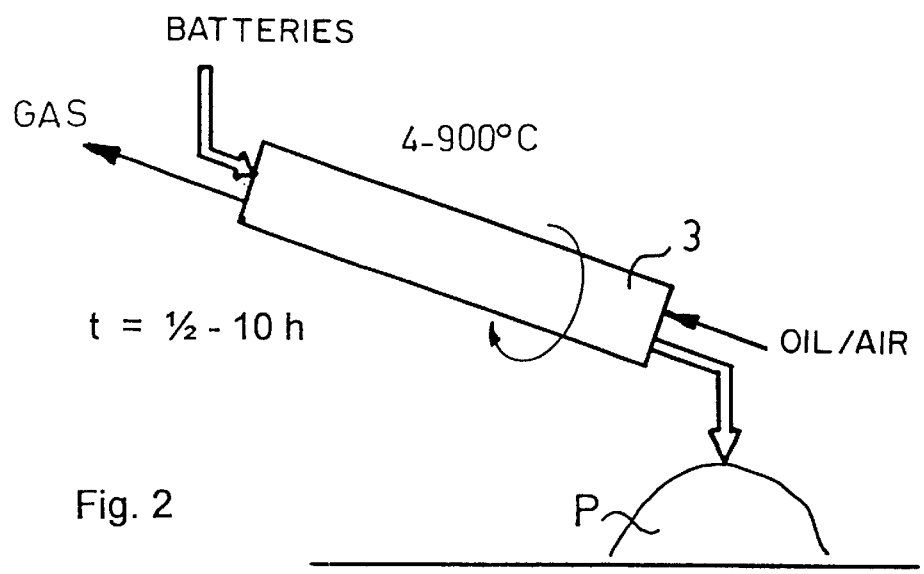
FIG. 2 is a representation of the oxidative combustion process.
Figure 3:
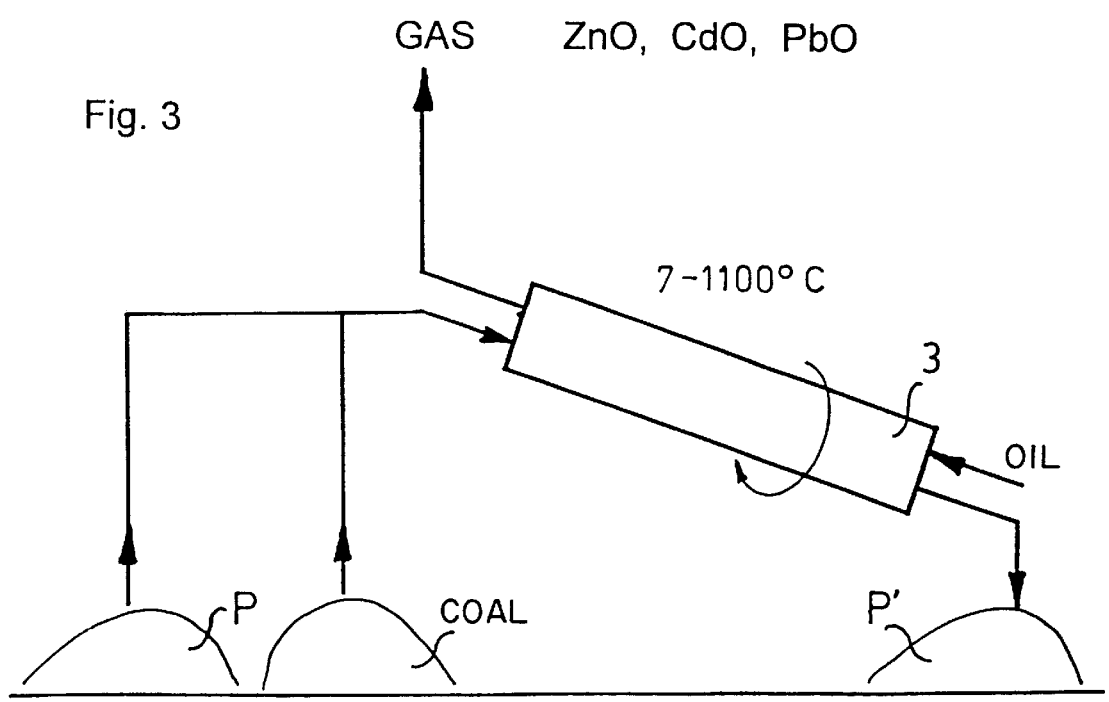
FIG. 3 is the second, reductive combustion process representing an option.

These conditions are schematically represented in FIG. 2. With the same installation, but without the shredder process, the oxidative product of combustion P can be further processed to a second, reductive product of combustion P'. This process is represented in FIG. 3. The rotary furnace 3 is now charged with the oxidative product of combustion P along with a quantity of coal. The coal here represents a preferred reducing agent. Other reducing agents are however not excluded. In comparison with the oxidative combustion, the reductive combustion takes place at a higher temperature. This can, in principle, lie between 500° C. and 1300° C., but should preferably be between 700° C. and 1100° C. The gaseous components produced herein are initially distilled off. The remaining exhaust gases can be led through the exhaust gas cleansing process described above. In this manner zinc, cadmium and, where present, lead are removed from the product of combustion P by distilling off these metals and reoxidation in the vapor phase. The reductive product of combustion P' remaining can in turn be sent to the metal winning process 8. This product, which now consists principally of $Fe_2O_3$ and $MnO_2$, has become a raw material which steel works gladly accept as ferro-manganese. The manufacture of this product of combustion P' will be opted for in those cases where the product of combustion P is in low demand and consequently commands an especially low price. As a consequence, the battery recycling works need not install a store for raw materials. The elements zinc, cadmium and lead distilled off in the second, reductive burning process can be sold anyway without difficulty.

The combustion in the second step takes place at a higher temperature, than in the first step. At this temperature the slag present in the rotary furnace is reduced and metals are vaporized. By virtue of the air blown in, the metals oxidize again in the gaseous phase above the slag, form oxides in finest, solid form and are blown out of the rotary furnace with the remaining air into a multi-stage gas cleansing process.

Naturally, this simple process can also be augmented by means of certain options in order to split off special fractions, but this would in turn make the extremely economical installation more expensive, and would partially reduce the commercial advantages of the process. On the other hand, such steps could be taken by the recipients of these products, especially when the required installations are already present at these metal winning works anyway.

Figure 4:
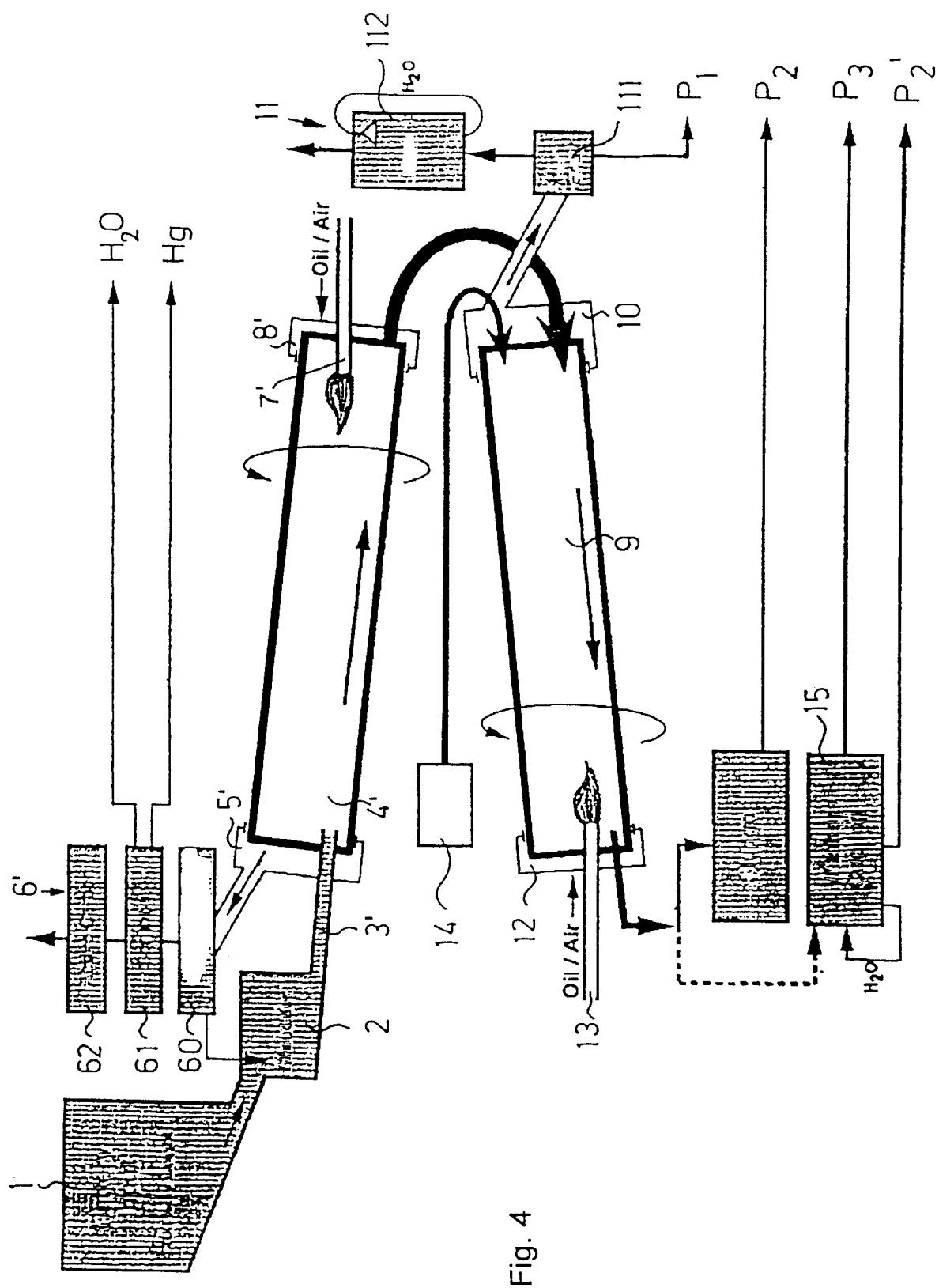
FIG. 4 is a process with a first and a second treatment stage.

In FIG. 4, the process is schematically represented. Beginning at a supply bunker 1 in which the batteries or the scrap produced from them are present, these enter directly or, as shown here, via a shredder 2 and a feeding line 3' into a rotary furnace 4'. The rotary furnace is charged from the one side and fired from the other side. The rotary furnace can be varied on the one hand with respect to the angle of inclination and on the other hand with respect to the speed of rotation. Customary rotary furnaces have a length of 7–12 m. In the first stage, however, an overlong rotary furnace of 25–50 m can be employed, which allows a substantial temperature drop from the input end to the firing at the output end. The degree of mixing can be adjusted via the speed of rotation, whereas the angle of inclination varies the time of passage. In the case of batch operation, the rotary furnace can be suspended horizontally for a certain period of time and simply be inclined as needed for discharging the solid product of combustion.

During the operation, the battery scrap passes through the rotary furnace from the charging end to the firing end. At the charging end, a sealed off gas outlet 5' is provided, through which the non solid products of combustion arrive at a multi-stage gas cleansing process 6'. At the opposite firing end there is a burner nozzle 7', via which both oil and air combined are blown into the rotary furnace 4'. At the firing end the rotary furnace 4' is provided with a sealed off discharging device 8'. This first rotary furnace 4' is operated, at least in the region of the input end, preferably up to the middle of the furnace, below that temperature which can lead to dioxin formation, namely below 720° C. Temperatures between 500° C. and 700° C. are customary, and a combustion temperature of about 600° C. is especially preferred. At these temperatures it is ensured that the organic constituents burn away completely and that water as well as any mercury that may be present is extensively vaporized. In the region of the output end of the first rotary furnace, the temperature can be increased to 900° C. in order to ensure a complete vaporization off of mercury to less than 1 ppm. This first treatment step leads to a weight reduction of 30% to 50% according to experience. As a consequence, 50 to 70% by weight of the quantity supplied leave the rotary furnace 4' through the firing end. The 30 to 50% by weight of volatile components leave the rotary furnace 4' via the sealed off gas outlet 5' and are cleansed in the multi-stage gas cleansing process 6'. This is done in a first step by a cyclone or hot filter 60, in which the fly components are filtered out, which can in turn be fed back into the process, e.g. via the shredder 2. The remaining gases are passed through a wet cleaner 61 in which about 0 to 1% by weight of mercury, if present, as well as 15 to 20% by weight of water are separated off. The thus cleansed gases are finally released through an active charcoal filter as cleansed exhaust gases.

The solid products of combustion of the first treatment step enter from the first rotary furnace 4' into a second rotary furnace 9. The second rotary furnace 9 corresponds completely in construction to the first rotary furnace 4'. At the charging side a sealed off gas outlet 10 and a multi-stage gas cleansing process 11 are again provided. At the firing side a sealed off discharging device 12 is correspondingly provided. Again a burner nozzle 13 protrudes through the sealed off discharging device 12 into the rotary furnace 9. Here again the burner nozzle 13 introduces oil as well as air into the combustion chamber of the rotary furnace 9. By means of a reducing agent supply 14, a reducing agent is introduced into the second rotary furnace 9 at the charging end. This can be done separately or together with the solid products of combustion, which are fed from the first rotary furnace 4' into the second rotary furnace 9. In the case of a joint supply the solid products of combustion from the first treatment step can be mixed prior to charging with the reducing agent before these are introduced jointly. Coal is especially suitable as a reducing agent. This is an especially economical reducing agent which simultaneously serves as an energy carrier. The solid product of combustion of the second treatment step still amounts to 20 to 40% by weight of the originally introduced weight of the battery scrap.

The combustion in the second treatment stage proceeds at a higher temperature than in the first treatment stage, namely at a temperature, from 900° C. to 1200° C. At this temperature the slag present in the rotary furnace 9 is reduced and the zinc, cadmium and lead constituents are vaporized. Due to air blown in via the nozzle 13, the zinc, cadmium and lead constituents which are present in the gas phase above the slag oxidize and thus form the corresponding oxides in finest, solid form and are blown out of the rotary furnace 9 with the remaining air via the sealed off gas outlet 10 into the multi-stage gas cleansing process 11. Here as well, the volatile components blown out first arrive at a hot filter 111, in which the now solid zinc, cadmium or lead oxides are separated out. These form an oxide mixture which form a product designated as P1. This product represents approximately 30 to 50% by weight of the batteries or battery scrap initially input. The exhaust gases separated off in the hot filter 111 are again here in turn led through a wet filter 112 before they are finally released into the atmosphere. The third cleansing step by means of an active charcoal filter can be dispensed with here.

The slag discharged from the firing end of the second rotary furnace 9 contains mostly iron, nickel and manganese metals as well as oxides and a residual component of impurities. This slag forms a second reutilization product which is here designated as P2. This product P2 is highly welcome as an input product for direct reutilization in the metal winning industry. It may, however, be the case that a relatively considerable component, namely about 3 to 6% by weight of the initial starting product, consists of soluble salts. In this case, the slag is put through a washing and cooling unit 15. In this manner, the soluble salts can be separated out as a further product P3. This step of the process is especially worthwhile if a relevant portion of the soluble salts can be reutilized economically. This is especially the case for lithium salts. The remaining insoluble product is designated by P2' and has essentially the same composition as the product P2 and is reduced in weight merely by the amount of the soluble components.

The exceedingly economical process in accordance with the invention yields in principle merely two end products. The product P1, consisting of a mixture of zinc, cadmium or lead oxides, serves as starting product for the common winning process of zinc and lead in the known cupola furnace process of the Imperial Smelting Corporation. The cadmium oxides also contained in the product P1 can also be separated off without changing the process. Consequently, the product P1 represents a saleable output product for the metal winning industry.

Whereas the product P1 represents the oxidation product of the second treatment step, the product P2 is the reduction product of the second treatment step. The product P2, the quantitatively largest constituents of which are iron, nickel and manganese, can be sent directly to the steel industry without further separation of this mixture. The utilization of the product P2 in the steel industry corresponds to absolutely conventional methods and need not be described further here. The same remark holds, of course, for the product P2' as well. The product P3 only occurs if it is known that a substantial part of the soluble salts contain valuable constituents which are reusable. In principle the product P3 can always be dispensed with.

Preliminary calculations have shown that the process in accordance with the invention reduces the recycling costs for unsorted old batteries by a factor of three to seven in comparison with the known procedures. The reasons for this are many and varied. Firstly, the installation costs are extremely low in comparison with the known processes, secondly the process is completely nontoxic, and finally, the requirement of expensive energy is extremely modest. This results from two causes, the first of which is namely that in the first treatment step diverse metals oxidize exothermally, and the second of which is that in the second treatment step the reducing agent is an economical energy carrier, namely coal.

The process in accordance with the invention can be operated continuously as represented and described here by working with two rotary furnaces arranged in series, where the handling costs are extremely low, since the process can then run practically fully automated and almost without attendants, which represents a considerable advantage in high wage countries. The process can, however, also be operated with a single rotary furnace, in which case the operation is carried out in batches. In this case, the second hot filter and the second wet cleanser can be dispensed with. This represents yet a further reduction in the already very low investment costs, which makes the process acceptable in developing countries as well, although the amount of work to be performed manually is increased.

In summary, the following may be noted: In order to reduce the installation costs for carrying out a process of recycling unsorted batteries, a substantially simplified process is proposed. In it the unsorted batteries as they arrive from the disposal collection are led from a feeding bunker (1) through a shredder (2) directly into a rotary furnace (3). In this process, the shredded batteries are oxidatively burned at a temperature from 400° C. to 900° C. for a period of preferably 45 to 90 minutes. The resulting combustion gases are led over a gas cleansing installation (7) consisting of the known elements dust filter (4), wet washing filter (5) and active charcoal filter (6). The oxidized product of combustion (P) resulting from the combustion is fed to the metal winning process (8). The product of combustion (P) can be burned once again in a further or later step by the rotary furnace (3) after mixing with a reducing substance, coal, after which the resulting reductive product of combustion can again be fed to the metal winning process (8).

What is claimed is:

1. A process for the recycling of batteries using pyrolytic methods such that the batteries need not be sorted, the method comprising:

placing the batteries into a shedder that continually charges a furnace;

performing an oxidative combustion in the furnace for at least 30 minutes at a temperature in a range of between 400° C. and 900° C.;

evaporating and separating off mercury;

burning paper and plastic components;

producing an oxidized product of combustion during oxidation of metals; and feeding the oxidized product of combustion as a raw material to a process for winning of metals.

2. A process in accordance with claim 1 wherein the batteries are dry.

3. A process in accordance with claim 1 wherein the batteries contain at least one of either cadmium, zinc, lead or alkaline metals.

4. A process in accordance with claim 1 wherein the oxidized product of combustion is fed directly as a raw material to the process for winning of metals.

5. A process in accordance with claim 1 wherein the oxidation of metals takes place at a temperature in a range of 600° C. and 700° C.

6. A process in accordance with claim 1 wherein the oxidation occurs at a temperature that increases in a direction of passage through the furnace.

7. A process in accordance with claim 1 wherein the combustion takes place during continuous motion of the oxidized product of combustion and continuous supply of a gas mixture containing oxygen.

8. A process in accordance with claim 1 wherein the combustion is performed in a rotary furnace.

9. A process in accordance with claim 3 wherein the oxidized product of combustion is fed to a zinc/cadmium winning process.

10. A process in accordance with claim 9 wherein the zinc/cadmium winning process is also a lead winning process.

11. A process in accordance with claim 3 wherein the oxidized product of combustion is fed to a lead winning process.

12. A process in accordance with claim 1 wherein the oxidized product of combustion is subjected to a second, reductive combustion with an addition of coal at an increased temperature in a range of 500° C. to 1300° C., and wherein gaseous components are removed and a remaining reductive product of combustion is fed to the metal winning process.

13. A process in accordance with claim 12 wherein the increased temperature is in a range of 700° and 1100° C.

* * * * *